US012801188B2

(12) United States Patent
Hsu et al.

(10) Patent No.: US 12,801,188 B2
(45) **Date of Patent: *Nov. 17, 2026**

(54) HINGE DEVICE AND DISPLAY DEVICE USING THE SAME

(71) Applicant: FOSITEK CORPORATION, New Taipei City (TW)

(72) Inventors: An Szu Hsu, New Taipei City (TW); Yan-Jiao Cheng, New Taipei City (TW); I-Hung Chiang, New Taipei City (TW)

(73) Assignee: FOSITEK CORPORATION, New Taipei City (TW)

( * ) Notice: Subject to any disclaimer, the term of this patent is extended or adjusted under 35 U.S.C. 154(b) by 99 days.

This patent is subject to a terminal disclaimer.

(21) Appl. No.: 18/920,118

(22) Filed: Oct. 18, 2024

(65) Prior Publication Data

US 2025/0355473 A1 Nov. 20, 2025

(30) Foreign Application Priority Data

May 14, 2024 (TW) ................................ 113117739

(51) Int. Cl.
*G06F 1/16* (2006.01)
*E05D 11/08* (2006.01)
*E05D 11/10* (2006.01)

(52) U.S. Cl.
CPC .......... *G06F 1/1681* (2013.01); *E05D 11/082* (2013.01); *E05D 11/1007* (2013.01); *G06F 1/1652* (2013.01); *F16M 2200/022* (2013.01)

(58) Field of Classification Search
CPC .... G06F 1/1652; G06F 1/1681; G06F 1/1616; G06F 1/1607; G06F 1/1618; G06F 1/1624; G06F 1/1641; G06F 1/1647; F16M 13/04; F16M 2200/022; E05D 11/082; E05D 11/1007
See application file for complete search history.

(56) References Cited

U.S. PATENT DOCUMENTS 8,720,011 B1 * 5/2014 Hsu ...................... G06F 1/1681 16/354
9,860,999 B1 * 1/2018 Hsu .......................... E05D 3/06
11,539,021 B2 * 12/2022 Large .................. H10K 59/871
(Continued)

FOREIGN PATENT DOCUMENTS

CN 110547555 A 12/2019

*Primary Examiner* — Abhishek M Rathod
(74) *Attorney, Agent, or Firm* — Rosenberg, Klein & Lee

(57) ABSTRACT

A hinge device includes a flexible plate, a plurality of pivot shafts connected to a plurality of supports fixed on one surface of the flexible plate, a plurality of torque plates respectively provided with a shaft hole and an elongated shaft hole. The pivot shafts are respectively extended through and pivotally connected to one shaft hole on one torque plate and one elongated shaft hole on an adjacent torque plate, such that the torque plates are arranged alternately to overlap each other. When the flexible plate responds to a force applied thereto to change between an extended state and a rolled state, the pivot shafts are brought by the supports to move in the elongated shaft holes, so as to adapt to a change in the length of two connected adjacent torque plates. A flexible display is connected to another side of the flexible plate to provide a display device.

23 Claims, 7 Drawing Sheets

(56) References Cited

U.S. PATENT DOCUMENTS

| | | | | |
|---|---|---|---|---|
| 11,553,612 | B2 * | 1/2023 | Chen | H05K 5/0226 |
| 11,573,610 | B2 * | 2/2023 | Hsu | G06F 1/1681 |
| 11,732,748 | B2 * | 8/2023 | Hsu | E05D 7/00 16/225 |
| 11,792,947 | B2 * | 10/2023 | Kim | H05K 5/0226 361/807 |
| 11,830,391 | B2 * | 11/2023 | Eguchi | G06F 1/1652 |
| 11,977,420 | B2 * | 5/2024 | Ou | H04M 1/0268 |
| 12,092,151 | B2 * | 9/2024 | Trzaskos | F16C 11/04 |
| 2014/0174226 | A1 * | 6/2014 | Hsu | G06F 1/1681 74/98 |
| 2016/0090763 | A1 * | 3/2016 | Hsu | E05D 3/122 16/354 |
| 2016/0370828 | A1 * | 12/2016 | Hsu | G06F 1/1652 |
| 2016/0370829 | A1 * | 12/2016 | Hsu | G06F 1/1681 |
| 2017/0048996 | A1 * | 2/2017 | Han | H05K 5/0217 |
| 2018/0092223 | A1 * | 3/2018 | Hsu | G06F 1/1681 |

* cited by examiner

HINGE DEVICE AND DISPLAY DEVICE USING THE SAME

FIELD OF THE INVENTION

The present invention relates to a hinge device, and more particularly, to a hinge device that can be bent or extended and maintain at the bent state or the extended state, and would not gravitate down when it is in the extended state. The present invention also relates to a display device formed of the hinge device and a flexible display attached thereto.

BACKGROUND OF THE INVENTION

With the wide application of the wearable flexible display, many relevant pivot shaft torque mechanisms have also been introduced into the market. For example, China Patent Publication No. CN 111556687B discloses a cover and a smart bracelet featured by a synchronizing component provided between a case and a cover that are connected to each other. The case includes a first case, two third cases, and a plurality of second cases that are arranged parallelly. The cover includes a first cover, two third covers, and a plurality of second covers, which are correspondingly connected to the first, the third, and the second cases. The synchronizing component includes a plurality of overlapped and staggered hinge bases, on which shaft sections are provided to extend through staggered first, second and third hinges and damper hinges. The damper hinges include a plurality of overlapped and staggered strip-like bodies, each of which has an elongated damping slot and a shaft hole for engaging with one adjacent shaft section. The damping slot is provided at two ends with a first and a second locating slot, and provided at the end close to the first locating slot with an open cut. The damping slot is used to clamp the shaft section thereto to generate a resistance (torque) to a pivotal rotation of the shaft section. When the synchronizing component is in a fully extended state, the shaft sections are located in the first locating slots; and when the synchronizing component is in a fully bent state, the shaft sections are located in the second locating slots, so as to adapt to a reduced length at an inner side of the synchronizing component.

The above structure in practical application has the following drawbacks:

(1) When the above conventional wearable flexible display (i.e. the smart bracelet) is in use, the flexible display usually has to be extended into a flat state for a user to touch the flexible display and perform different functions. However, the elongated damping slots on the damping hinges provide only a simple torque (i.e. frictional resistance) to the shaft sections without any function of guiding the shaft sections to move and locking the shaft sections at some specific angle (for fully extending or bending the flexible display). Therefore, the flexible display could not be held in the same state when it is fully extended or fully bent. Further, when the flexible display in the extended and flat state is touched with a force, the damping hinges might not be able to withstand the force to result in bending and deformation of the flexible display, which has a direct adverse influence on the user's operation on the flexible display and forms an serious disadvantage in the application of the flexible display.

(2) The case consists of the parallelly arranged first, second and third cases that respectively have a flat top. When the case is bent, uneven and sharp protrusions would be formed at joints among the first, the second, and the third covers. These sharp protrusions not only have an adverse influence on the evenness of the flexible display provided on the top of the cases, but also cause abrasion and damage of the flexible display in some worse condition.

(3) The adjacent hinge bases of the synchronizing component are movably connected by overlapping each other, there would be a relatively large friction between the adjacent hinge bases when they move. Further, when the adjacent hinge bases are extended or bent, they are apt to be stuck at some specific angular positions to adversely influence the smooth extending or bending of the whole flexible display.

(4) The strip-like bodies of the damping hinges are movable in a linked motion due to a torque (i.e. a frictional resistance) transmitted between the damping slots and the shaft sections. When the case starts bending, it is usually difficult for the first, the second, and the third cases located at different locations to bend synchronously and the cases at different areas tend to have non-uniform curvatures to affect the delicacy and overall quality of the product.

In view of the drawbacks of the conventional pivot shaft torque mechanism for the wearable flexible display, it is tried by the inventor to develop an improved hinge device to overcome these drawbacks.

SUMMARY OF THE INVENTION

A primary object of the present invention is to provide a hinge device that includes a flexibly bendable flexible plate, a plurality of supports equally spaced and parallelly arranged on one surface of the flexible plate, a plurality of pivot shafts connected to at least one of two ends of the supports, a plurality of first torque plates respectively provided with a first shaft hole and a first elongated shaft hole, and a plurality of second torque plates respectively provided with a second shaft hole and an elongated shaft hole. Each of the pivot shafts is extended through and pivotally connected to one first shaft hole on one of the first torque plate and one second elongated shaft hole on one adjacent second torque plate, or one first elongated shaft hole on one of the first torque plate and one second shaft hole on one adjacent second torque plate, such that the first and the second torque plates are arranged alternately and overlap each other to be connected serially via the pivot shafts. Further, the first and the second torque plates are respectively provided with a first/second front stop section and a first/second rear stop section. When the flexible plate changes between an extended and a bent state in response to an external force applied thereto, the pivot shafts are brought by the flexible plate to move in the first and the second elongated shaft holes synchronously in a linked motion, so as to adapt to a change in an overall length of the connected first and second torque plates that occurs when the flexible plate is moved. Meanwhile, the pivot shafts in the first and the second elongated shaft holes interfere with the front or the rear stop sections to provide a self-locking or locating mechanism between the first and the second torque plates. When the flexible plate is fully extended into a flat state, the pivot shafts interfere partially with the first and the second shaft holes, such that the torque plates act on the pivot shafts for the latter to generate a force for pushing the flexible plate to keep the flat state and giving the flexible plate a structural strength required to withstand an operational force applied thereto.

Another object of the present invention is to provide the above hinge device, of which each of the first and the second elongated shaft holes includes a first and a second inward protruded curved section, respectively, which is located at a middle portion of the first and the second elongated shaft hole. The first elongated shaft hole is divided into a first front space and a first rear space based on the first inward protruded curved section; and the second elongated shaft hole is divided into a second front space and a second rear space based on the second inward protruded curved section. The first and the second inward protruded curved sections respectively define the first/second front stop section and the first/second rear stop section, which are located corresponding to the first/second front and the first/second rear space. Each of the pivot shafts is movable in the first/second front space or in the first/second rear space and is pressed against the first/second front stop section or the first/second rear stop section to be held in place, such that the flexible plate can be correspondingly held to the fully bent state or the fully extended flat state.

A further object of the present invention is to provide the above hinge device, of which each of the pivot shafts is provided with a flat portion, and each of the first and the second shaft holes are provided with a first and a second straight portion, respectively. When the flexible plate is fully extended into the flat state, the flat portions are rotated to a position being partially interfered with the first and the second straight portion, such that the flexible plate is brought by the pivot shafts as a linked motion to generate a force for keeping the flexible plate in the flat state.

A still further object of the present invention is to provide the above hinge device, to one side surface of which a flexible display can be attached to form a display device. The flexible display is attached to the side surface of the hinge device that is located opposite to the supports and is extendable and bendable synchronously with the flexible plate. The flexible display is supported by the flexible plate and accordingly, has a structural strength sufficient to withstand an operational force applied thereto.

The structure and the technical means adopted by the present invention to achieve the above and other objects can be best understood by referring to the following detailed description of the preferred embodiment and the accompanying drawings.

BRIEF DESCRIPTION OF THE DRAWINGS

Wherein, the accompanying drawings include.

DETAILED DESCRIPTION OF THE PREFERRED EMBODIMENTS

Figure 1:
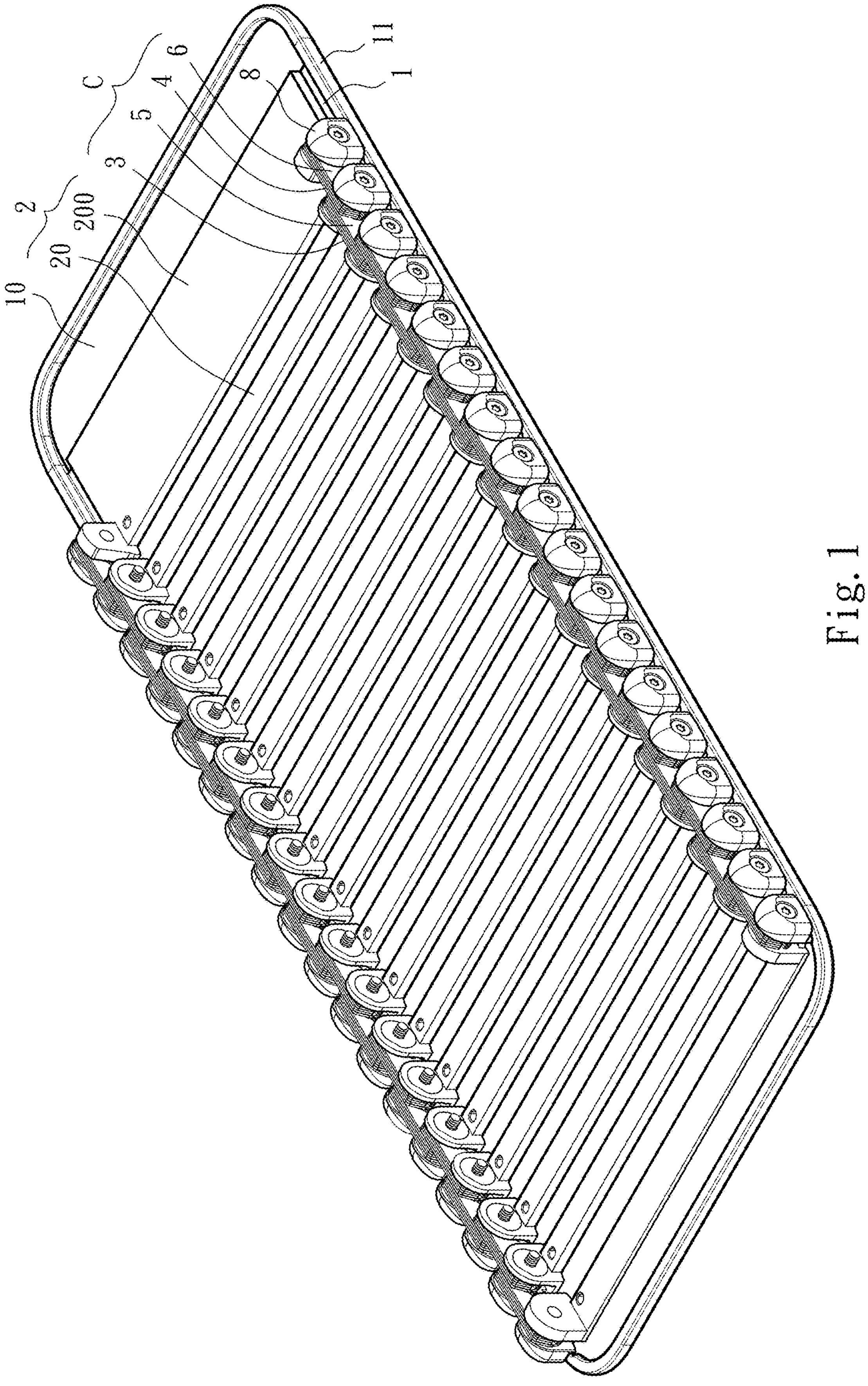
FIG. 1 is an assembled perspective view of a display device according to a preferred embodiment of the present invention.
Figure 2:
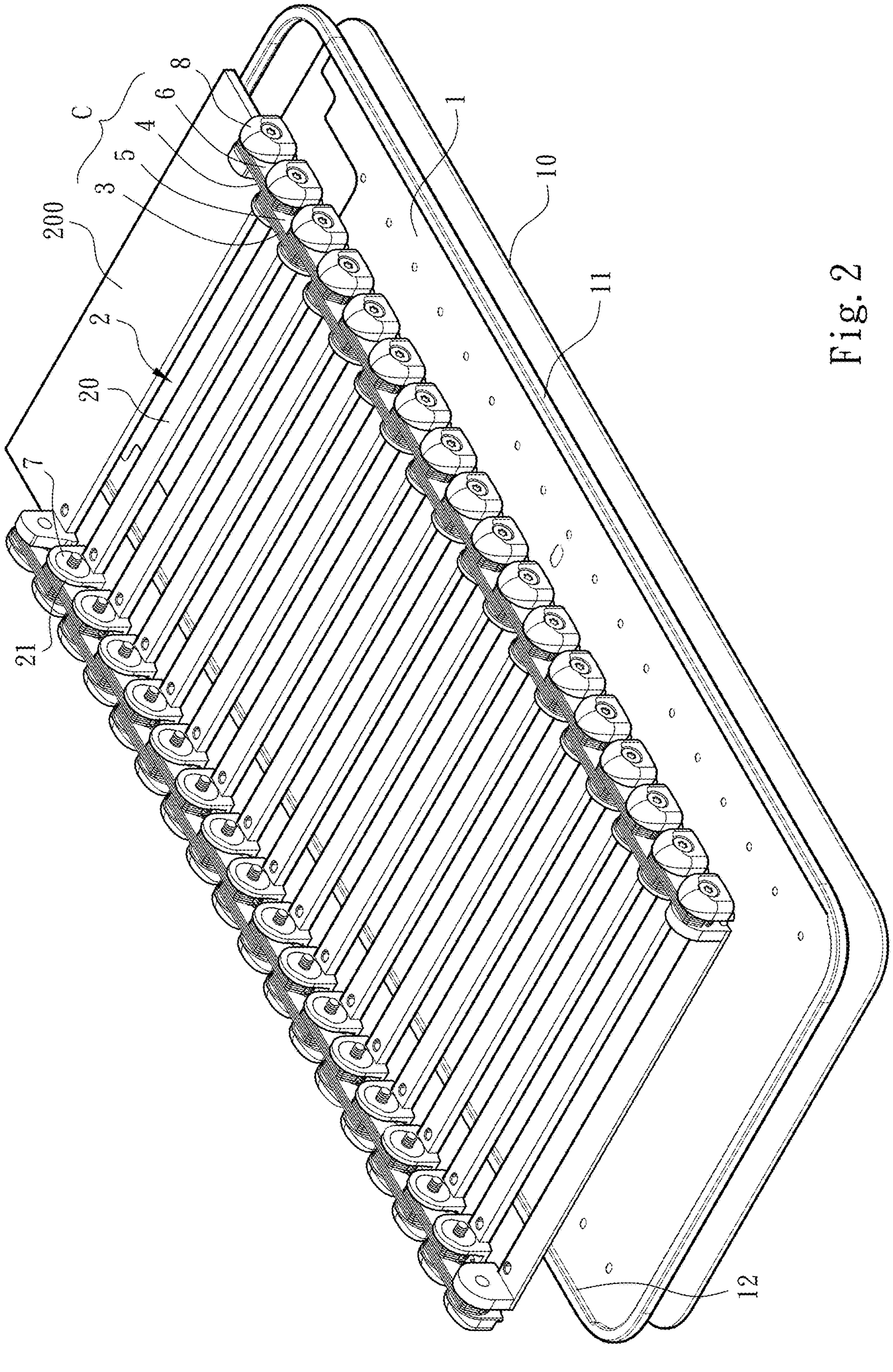
FIG. 2 is a partially exploded view of FIG. 1 showing a flexible display is separated from a flexible plate, a support unit and a torque chain unit included in the display device.
Figure 3:
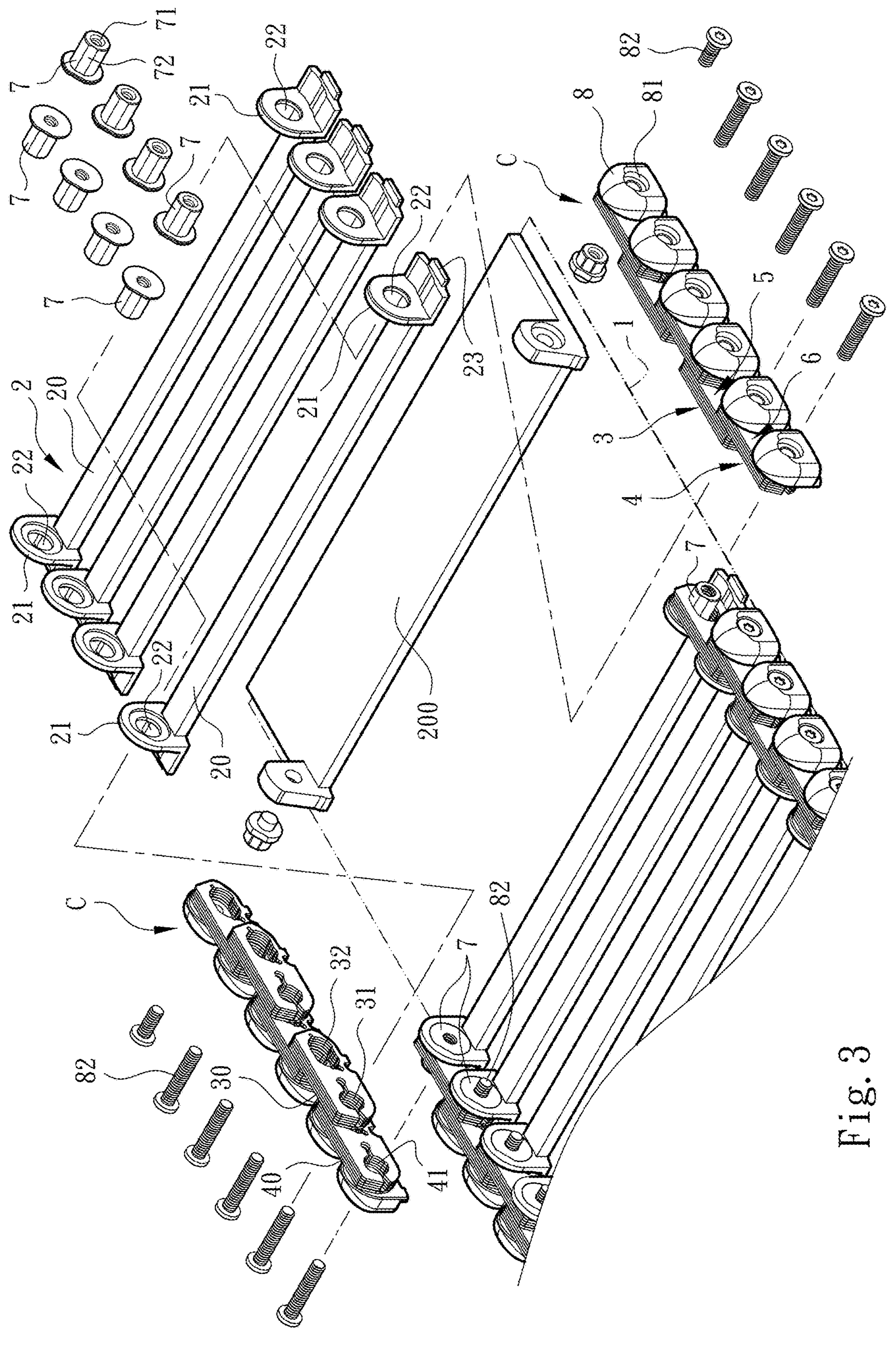
FIG. 3 is a partially assembled perspective view of a hinge device according to a preferred embodiment of the present invention.
Figure 4:
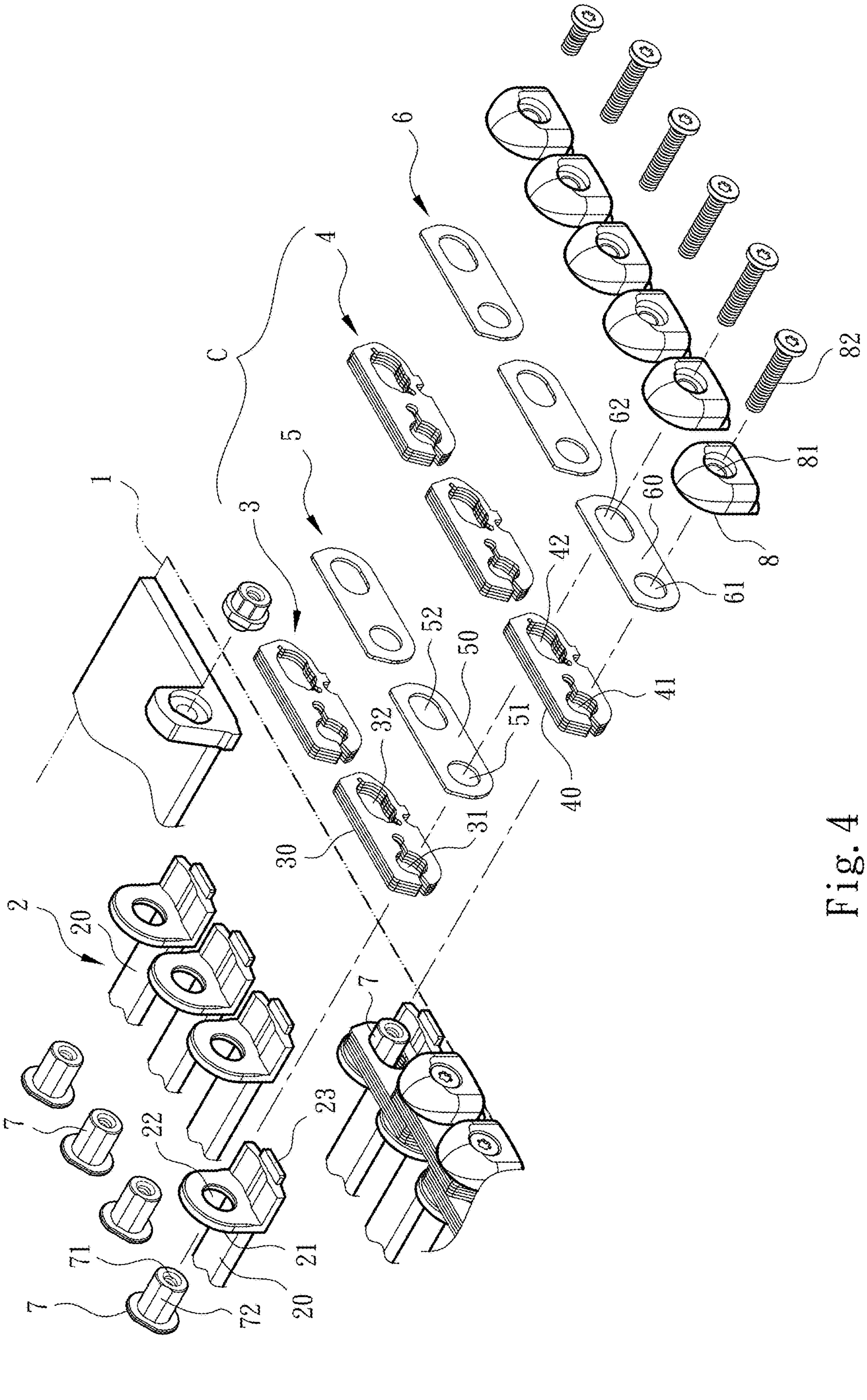
FIG. 4 is a fully exploded perspective view of the hinge device according to the preferred embodiment of the present invention.
Figure 5:
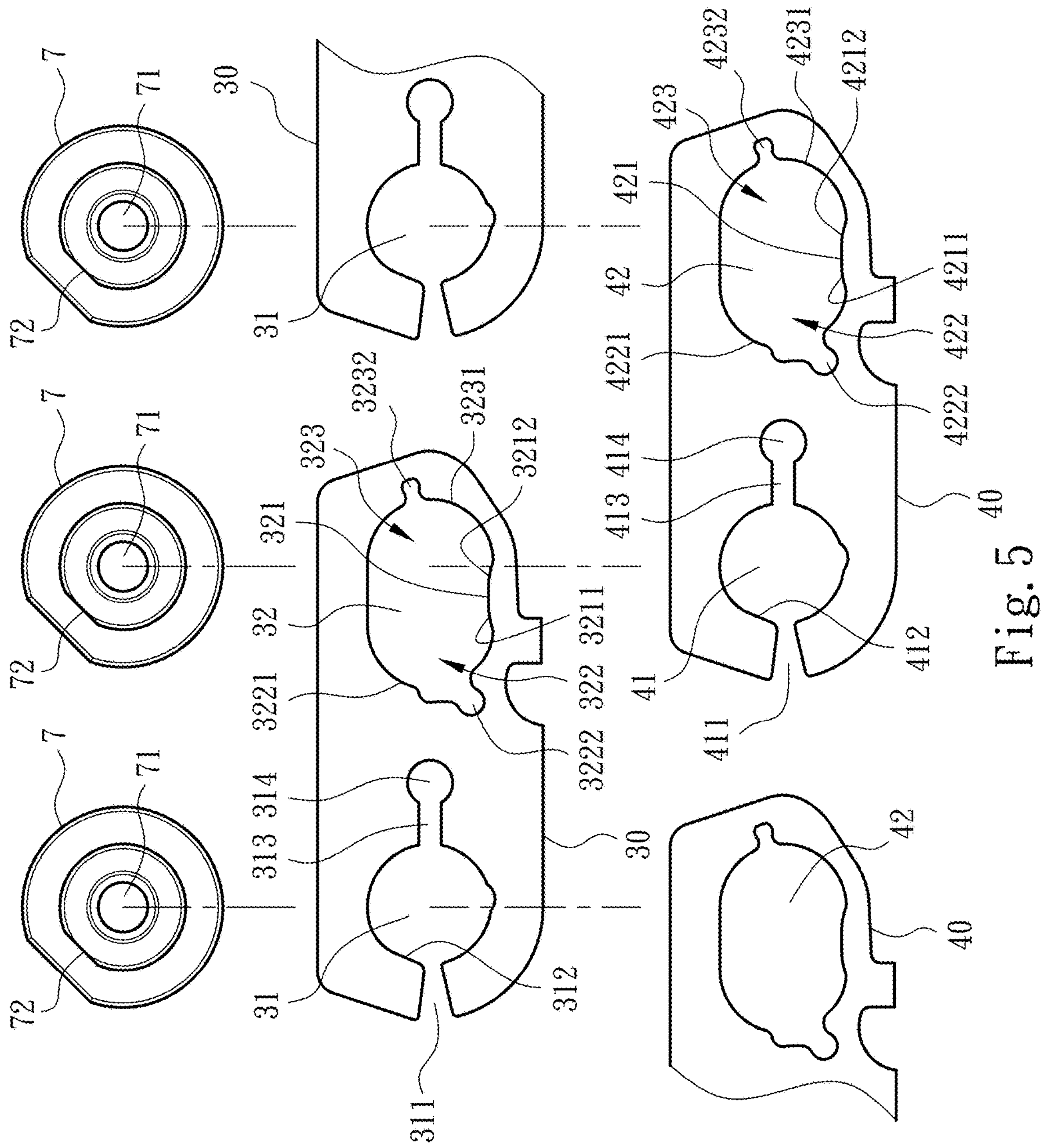
FIG. 5 is a side view showing the arrangement of first and second torque plates and their positions relative to pivot shafts included in the hinge device of the present invention.

Please refer to FIGS. 1 to 5. A display device according to a preferred embodiment of the present invention mainly includes a flexible plate 1, a support unit 2, a plurality of pivot shafts 7, and a torque chain unit C. The flexible plate 1 is a flexibly bendable plate having a frame 11 connected to outer edges thereof. The frame 11 is provided along an inner periphery with a groove 12. In an operable embodiment, a flexible display 10 is connected to one side of the flexible plate 1 opposite to the groove 12, and the flexible display 10 is bendable or extendable synchronously with the flexible plate 1.

The support unit 2 includes a plurality of elongated supports 20 that are parallelly arranged and equally spaced. Each of the supports 20 is provided at each of two ends with an axially extended protrusion 23 and an L-shaped transverse supporting section 21. The axial protrusion 23 can be inserted into the groove 12 of the frame 11, such that the supports 20 are connected to one side of the frame 11 opposite to the flexible display 10. And, each of the supporting sections 21 is provided with an engaging bore 22 that extends through the supporting section 21.

In an operable embodiment, the support unit 2 includes at least one base 200 located in parallel with the supports 20. Circuit components required for controlling the flexible display 10 to do related operations are provided on the base 200.

The pivot shafts 7 are respectively extended through and connected to one of the engaging bores 22, such that a line of centers L of the pivot shafts 7 is extended in parallel with the flexible plate 1. Each of the pivot shafts 7 is provided on an outer surface with an axially extended flat portion 72 and is provided at a distal end surface farther away from the supporting section 21 with a fastening hole 71.

The torque chain unit C consists of a first torque plate set 3 and a second torque plate set 4. The first torque plate set 3 includes a plurality of first torque plates 31 respectively having a first shaft hole 31 and a first elongated shaft hole 32 for fitting on around two adjacent pivot shafts 7. The first elongated shaft hole 32 is provided at a middle portion of at least one side with a first inward protruded curved section 321, based on which an internal space of the first elongated shaft hole 32 is divided into a first front space 322 located closer to the first shaft hole 31 and a first rear space 323 located farther away from the first shaft hole 31.

In the above structure, the first elongated shaft hole 32 is provided at an end closer to the first shaft hole 31 with a first front curved edge 3221, and at another end farther away from the first shaft hole 31 with a first rear curved edge 3231. The first front curved edge 3221 includes a first retreated portion 3222, and the first rear curved edge 3231 includes a first rear retreated portion 3232. The first front and rear retreated portions 3222, 3232 provide the first elongated shaft hole 32 with an elasticity for expansion and deformation, and can be used to receive a required amount of lubricant. Further, the first inward protruded curved section 321 defines a first front stop section 3211 facing toward the first front space 322, and a first rear stop section 3212 facing toward the first rear space 323.

In an operable embodiment, the first shaft hole 31 is provided on its periphery with a first outer cut 311 communicable with an outer side of the first shaft hole 31, and a first straight portion 312. Another end of the first shaft hole 31 farther away from the first outer cut 311 is communicable with a hollow hole 314 via a first inner cut 313. The first inner cut 313 and the first hollow hole 314 provide the first shaft hole 31 with an elasticity for expansion and deformation, and can be used to receive a required amount of lubricant.

The second torque plate set 4 includes a plurality of second torque plates 40 respectively having a second shaft hole 41 and a second elongated shaft hole 42 configured corresponding to the first shaft hole 31 and the first elongated shaft hole 32, respectively, for fitting on around two adjacent pivot shafts 7, such that each of the second torque plates 40 is connected to and overlaps one of the first toque plate 30 via one common pivot shaft 7 that extends through the second elongated shaft hole 42 of the second torque plate 40 and the first shaft hole 31 of the adjacent first torque plate 30, or extends through the second shaft hole 41 on the second torque plate 40 and the first elongated shaft hole 32 of the adjacent first torque plate 30. The second elongated shaft hole 42 is provided at a middle portion with a second inward protruded curved section 421, based on which an internal space of the second elongated shaft hole 42 is divided into a second front space 422 located closer to the second shaft hole 41 and a second rear space 423 located farther away from the second shaft hole 41.

In the above structure, an end of the second elongated shaft hole 42 located closer to the second shaft hole 41 is provided with a second front curved edge 4221 and an end of the second elongated shaft hole 42 locate opposite to the second shaft hole 41 is provided with a second rear curved edge 4231. The second front curved edge 4221 includes a second front retreated portion 4222 and the second rear curved edge 4231 includes a second rear retreated portion 4232. The second front retreated portion 4222 and the second rear retreated portion 4232 provide the second elongated shaft hole 42 with an elasticity for expansion and deformation and can be used to receive a required amount of lubricant. Further, the second inward protruded curved section 421 defines a second front stop section 4211 facing toward the second front space 422 and a second rear stop section 4212 facing toward the second rear space 423.

In an operable embodiment, the second shaft hole 41 is provided on its periphery with a second outer cut 411 communicable with an outer side of the second shaft hole 41, and a second straight portion 412. An end of the second shaft hole 41 opposite to the second outer cut 411 is communicable with a second hollow hole 414 via a second inner cut 413. The second inner cut 413 and the second hollow hole 414 provide the second shaft hole 41 with an elasticity for expansion and deformation, and can be used to receive a required amount of lubricant.

In practical application of the present invention, when the pivot shafts 7 are located in the first and the second front spaces 322, 422, there is a gap left between a partial surface of each pivot shaft 7 and each of the first and the second front curved edges 3221, 4221; the gaps and the first and the second front retreated portions 3222, 4222 enable the first and the second front spaces 322, 422 to temporarily elastically expand, so that the pivot shafts 7 can fully pass through the first and the second inward protruded curved section 321, 421 into the first and the second front spaces 322, 422. Similarly, when the pivot shafts 7 are located in the first and the second rear spaces 323, 423, there is a gap left between a partial surface of each pivot shaft 7 and each of the first and the second rear curved edges 3231, 4231; the gaps and the first and the second rear retreated portions 3232, 4232 enable the first and the second rear spaces 323, 423 to temporarily elastically expand, so that the pivot shafts 7 can fully pass through the first and the second inward protruded curved section 321, 421 into the first and the second rear spaces 323, 423.

In an operable embodiment, depending on actual need, the first and the second torque plate set 3, 4 may further have a first stop plate set 5 and a second stop plate set 6, respectively, superposed thereon. The first stop plate set 5 includes a plurality of first stop plates 50, and the second stop plate set 6 includes a plurality of second stop plates 60. The first stop plates 50 are superposed on the first torque plates 30 and are respectively provided with a first limiting hole 51 corresponding to the first shaft hole 31 and a first elongated limiting hole 52 corresponding to the first elongated shaft hole 32 for fitting on around two adjacent pivot shafts 7. The second stop plates 60 are superposed on the second torque plates 40 and are respectively provided with a second limiting hole 61 corresponding to the second shaft hole 41 and a second elongated limiting hole 62 corresponding to the second elongated shaft hole 42 for fitting on around two adjacent pivot shafts 7, so as to prevent the pivot shafts 7 from loosening from the first and the second torque plates 30, 40.

In the preferred embodiment, the distal end of each of the pivot shafts 7 located farther away from the support 21 is provided with a fastening hole 71. A pressing cover 8 is fitted on the pivot shaft 7 and located around the fastening hole 71. The pressing cover 8 is provided with a through hole 81 for a fastening element 82 to extend therethrough into the fastening hole 71, so that the pressing cover 8 is fixedly fastened to the distal end of the pivot shaft 7.

Figure 7:
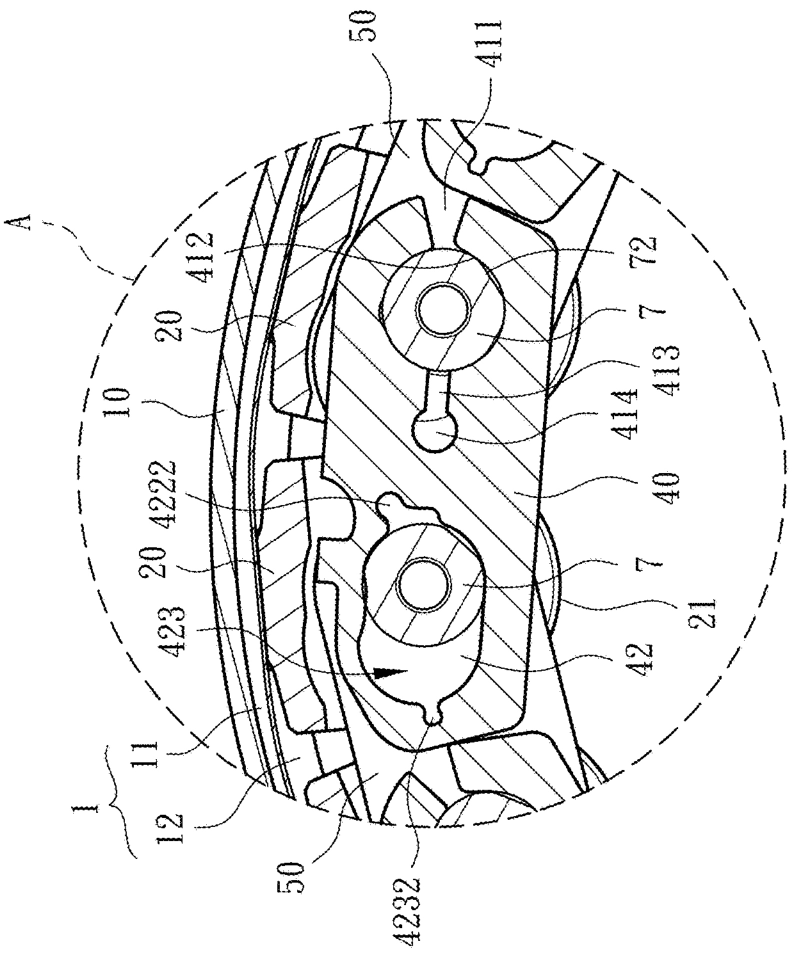
FIG. 7 is an enlarged view of the circled area A of FIG. 6.
Figure 6:
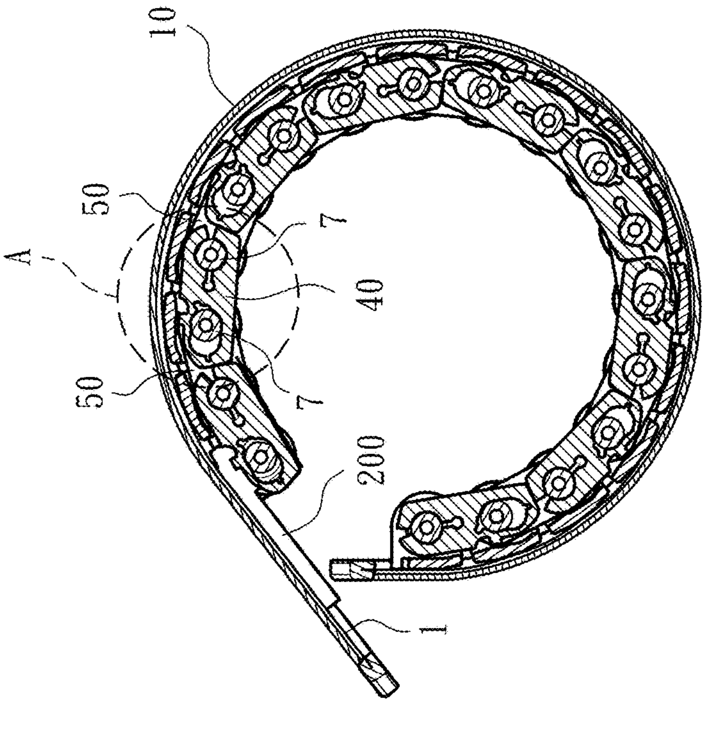
FIG. 6 is a side view of FIG. 1 showing the present invention in practical application, wherein the first and the second torque plates are in a fully bent and rolled state.

Please refer to FIGS. 6 to 9. When a user applies a force to bend the flexible display 10 and the flexible plate 1 into a fully rolled state, as shown in FIG. 6, the supports 20 engaged with the frame 11 are brought by the flexible plate 1 to move synchronously in a linked motion, such that the pivot shafts 7 are caused to move at the same time. A part of the pivot shafts 7 are located in the first front spaces 322 of the first elongated shaft holes 32 and held between the first front stop sections 3211 and the first front curved edges 3221. Meanwhile, the flat portions 72 of these pivot shafts 7 are rotated to a position partially having a large-angle interference with the second straight portions 412 of the second shaft holes 41. On the other hand, the adjacent pivot shafts 7 are located in the second front spaces 422 of the second elongated shaft holes 42 and held between the second front stop sections 4211 and the second front curved edges 4221. Meanwhile, the flat portions 72 of the adjacent pivot shafts 7 are rotated to a position partially having a large-angle interference with the first straight portions 312 of the first shaft holes 31, as shown in FIG. 7. Since the large-angle interference of the first and the second straight portions 312, 412 with the flat portions 72 generates only a relatively small guiding force and the pivot shafts 7 are held in the first and the second front spaces 322, 422, the first and the second torque plates 30, 40 are self-locked to the bent and rolled state. At this point, the supports 20 connected to the supports 20 are also held immovable, so that the flexible plate 1 connected to the supports 20 via the frame 11 and the flexible display 10 connected to the flexible plate 1 are also held immovable to maintain the bent and rolled state and can be worn on the user's wrist or other body area to be portable conveniently.

Figure 8:
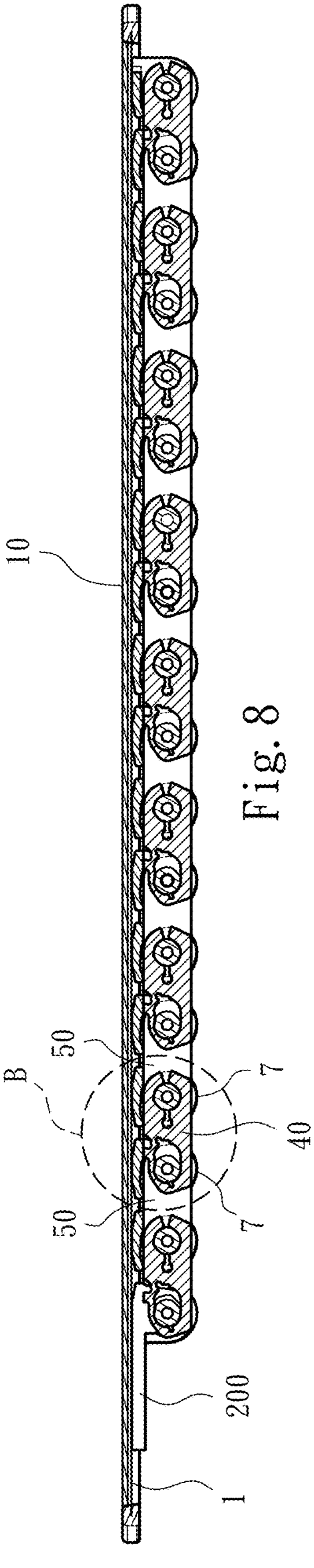
FIG. 8 is another side view of FIG. 1 showing the present invention in practical application, wherein the first and the second torque plates are in a fully extended and flat state.
Figure 9:
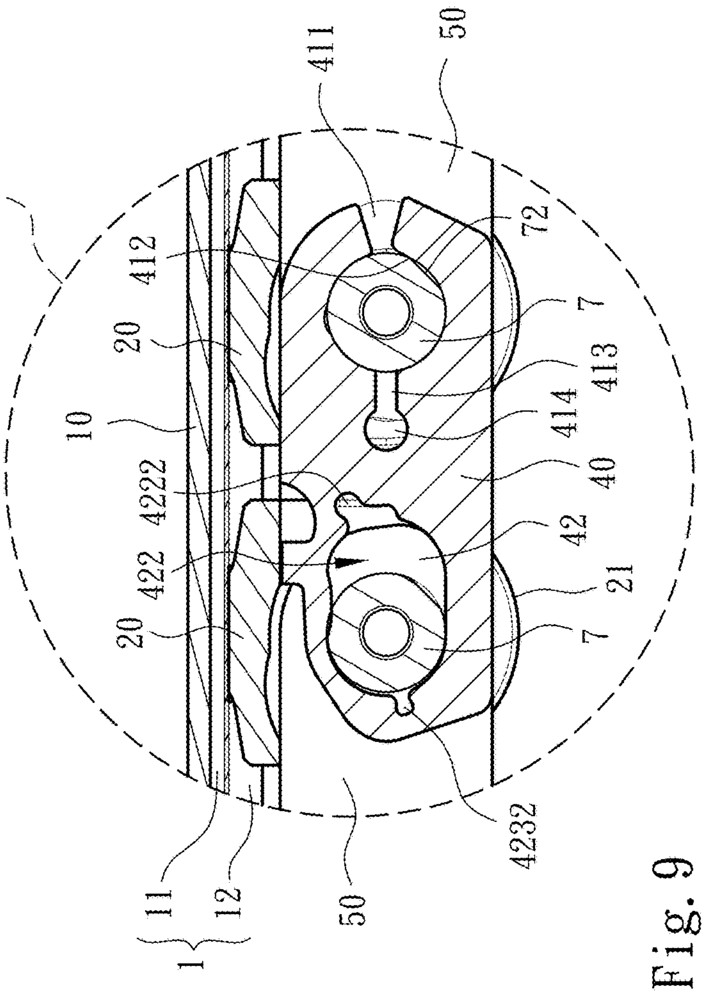
FIG. 9 is an enlarged view of the circled area B of FIG. 8.

When the user applies a force to extend the flexible plates 1 and the flexible display 10 into a fully flat state, as shown in FIG. 8, the supports 20 engaged with the frame 11 are brought by the flexible plate 1 to move synchronously in a linked motion, such that the pivot shafts 7 are caused to move at the same time. A part of the pivot shafts 7 are moved into the first rear spaces 323 of the first elongated shaft holes 32 to be held between the first rear stop sections 3212 and the first rear curved edges 3231. Meanwhile, the flat portions 72 of these pivot shafts 7 are rotated to a position partially having a small-angle interference with the second straight portions 412 of the second shaft holes 41. On the other hand, the adjacent pivot shafts 7 are moved in the second rear spaces 423 of the second elongated shaft holes 42 and held between the second rear stop sections 4212 and the second rear curved edges 4231. Meanwhile, the flat portions 72 of the adjacent pivot shafts 7 are rotated to a position partially having a small-angle interference with the first straight portions 312 of the first shaft holes 31, as shown in FIG. 9. When the pivot shafts 7 are fixedly held in the first and the second rear spaces 323, 423, the first and the second torque plates 30, 40 are self-locked to the fully extended flat state, and the first and the second straight portions 312, 412 have the function of guiding the flat portions 72 of the pivot shafts 7 to rotate to the position of being fully flatly attached to the first and second shaft holes 31, 41, which in turn enables the supports 20 connected to the pivot shafts 7 to be held in place, and accordingly, the flexible plate 1 connected to the supports 20 via the frame 11 and the flexible display 10 connected to flexible plate 1 are also held immovable and generate a force to keep the display device in the flat state with a structural strength sufficient to withstand an operational force applied thereto by the user's finger.

The above described hinge device and display device of the present invention in practical application have the following features:

(1) When the flexible plate 1 and the flexible display 10 are in a fully extended and flat state, the first and the second straight portions 312, 412 can guide the flat portions 72 on the pivot shafts 7 to rotate to a position being completely flatly attached to the first and the second shaft holes 31, 41, and the pivot shafts 7 are held in the first and the second rear spaces 323, 423. At this point, the pivot shafts 7 enable the flexible plate 1 and the flexible display 10 to generate a force to keep them in the extended and flat state and have a structural strength sufficient to withstand an operational force applied thereto by the user's finger.

(2) The first and the second elongated shaft holes 32, 42 are respectively provided at a middle portion with the first and the second inward protruded curved section 321, 421, which can stop and hold the pivot shafts 7 in the first and the second front spaces 322, 422 or the first and the second rear spaces 323, 423, so that the flexible plate 1 and the flexible display 10 can be self-locked no matter they are in the bent and rolled state or the extended and flat state.

(3) The pivot shafts 7 are spaced on the flexible plate 1. When the pivot shafts 7 are moved along with the first and the second torque plate set 3, 4, there would not be any bent or sharply protruded area appeared on the first and second torque plates 30, 40. Further, with the flexibility of the flexible plate 1, it can always maintain a smooth curved surface between the pivot shafts 7 to effectively avoid the flexible display 10 from abrasion and damage.

(4) In the process the flexible plate 1 and the flexible display 10 are extended or bent, the pivot shafts 7 are directly brought by the supports 20 to pivot synchronously, such that the first and the second torque plates 30, 40 also move synchronously with the pivot shafts 7. Further, the supports 20, to which the pivot shafts 2 are fixed, do not have any mechanism to cause direct contact of them with each other. Therefore, the flexible plate 1 and the flexible display 10 would not be stuck by anything when they are being extended or bent, enabling the flexible plate 1 and the flexible display 10 to be smoothly operable.

According to the above discussion, the hinge device and the display device using the same according to the present invention can be bent synchronously and held stably to the fully extended or bent state, and can be advantageously preloaded when they are fully extended to thereby effectively prevent the flexible plate and flexible display from gravitating down. Therefore, the present invention meets the requirements of novelty and improvement for granting a patent. It is also understood the present invention has been described with some preferred embodiments thereof and it is understood that many changes and modifications in the described embodiments can be carried out without departing from the scope and the spirit of the invention that is intended to be limited only by the appended claims.

What is claimed is:

1. A hinge device, comprising:

a flexibly-bendable flexible plate (1);

a support unit (2) including a plurality of parallelly-arranged and equally-spaced supports (20), the plurality of supports (20) being elongated, and opposing end portions of each of the plurality of supports (20) being connected to a corresponding side surface of the flexible plate (1);

a plurality of pivot shafts (7) being fastened to the plurality of supports (20), wherein a pivot shaft of the plurality of pivot shafts (7) is fastened to a corresponding one of the two end portions of the respective support of the plurality of supports (20); and two torque chain units (C), each of the two torque chain units (C) including a first torque plate set (3) and a second torque plate set (4) that are parallelly disposed relative to one another; the first torque plate set (3) including a plurality of first torque plates (30) and each of the plurality of first torque plates (30) is formed with a first shaft hole (31) and a first elongated shaft hole (32), the second torque plate set (4) including a plurality of second torque plates (40), wherein the plurality of second torque plates (40) and the plurality of first torque plates (30) of each of the two torque chain units (C) are arranged alternatively relative to one another for overlapping each other, and each of which the plurality of second torque plates (40) is formed with a second shaft hole (41) located corresponding to the first elongated shaft hole (32) of an overlapping first torque plate (30) and a second elongated shaft hole (42) located corresponding to the first shaft hole (31) of another overlapping first torque plate (30); each of the plurality of pivot shafts (7) being extended through and pivotally connected to a pair of correspondingly located first shaft hole (31) and second elongated shaft hole (42) or a pair of correspondingly located first elongated shaft hole (32) and second shaft hole (41) of each of the two torque chain units (C), thereby the plurality of second torque plates (40) and the plurality of first torque plates (30) of each of the two torque chain units (C) are, respectively, connected serially via the plurality of pivot shafts (7); and the flexible plate (1) being changeable in configuration between a flat state and a bent state responsive to an external force applied thereto whereby each of the first and the second elongated shaft holes (32, 42) provide the plurality of pivot shafts (7) with a displacement space for adapting to a change of interval between the plurality of first and the plurality of second torque plates (30, 40) of a corresponding one of each of the two torque chain units (C) and between the plurality of pivot shafts (7) when the flexible plate (1) is being changed in configuration.

2. The hinge device as claimed in claim 1, wherein each of the first and the second elongated shaft holes (32, 42) includes a first and a second inward protruded curved section (321, 421), respectively, the first and the second inward protruded curved sections (321, 421) being formed at a middle portion, respectively, of the first and the second elongated shaft holes (32, 42) for being located on at least one side of a displacement path of a corresponding one of the plurality of pivot shafts (7); the first elongated shaft hole (32) being divided into a first front space (322) and a first rear space (323) with respect to the first inward protruded curved section (321); and the second elongated shaft hole (42) being divided into a second front space (422) and a second rear space (423) with respect to the second inward protruded curved section (421).

3. The hinge device as claimed in claim 2, wherein the first inward protruded curved section (321) defines a first front stop section (3211) facing toward the first front space (322) and a first rear stop section (3212) facing toward the first rear space (323), and the second inward protruded curved section (421) defines a second front stop section (4211) facing toward the second front space (422) and a second rear stop section (4212) facing toward the second rear space (423); and wherein when the flexible plate (1) is in the bent state, the plurality of pivot shafts (7) are moved into the first and the second front spaces (322, 422) of the first and the second elongated shaft holes (32, 42) and pressed against the first and the second front stop sections (3211, 4211), respectively, to provide a locating effect of forcing the flexible plate (1) to remain bent; and wherein when the flexible plate (1) is extended for being in the flat state, the plurality of pivot shafts (7) are moved into the first and the second rear spaces (323, 423) of the first and the second elongated shaft holes (32, 42) and pressed against the first and the second rear stop sections (3212, 4212), respectively, to provide another locating effect of forcing the flexible plate (1) to remain flat.

4. The hinge device as claimed in claim 3, wherein each of the first and the second elongated shaft holes (32, 42) is formed with a first and a second front retreated portion (3222, 4222), respectively, at an end adjacent to the corresponding first shaft hole (31) and the corresponding second shaft hole (41), and each of the first and the second elongated shaft holes (32, 42) is further formed with a first and a second rear retreated portion (3232, 4232), respectively, at another end disposed away from the corresponding first shaft hole (31) and the corresponding second shaft hole (41).

5. The hinge device as claimed in claim 2, wherein each of the first shaft holes (31) is provided at a lateral side with a first straight portion (312) and a first outer cut (311), the first outer cut (311) communicating with an outer side of the first shaft hole (31), each of the second shaft holes (41) is provided at a lateral side with a second straight portion (412) and a second outer cut (411), the second outer cut (411) communicating with an outer side of the second shaft hole (41), and each of the plurality of pivot shafts (7) has formed on an outer surface a flat portion (72); and wherein when the flexible plate (1) is fully extended into the flat state, the flat portion (72) of each of the plurality of pivot shafts (7) is rotated to a position for being partially angularly interfered with a corresponding one of the first and the second straight portions (312, 412), the first torque plate set (3) and the second torque plate set (4), respectively, generating a force to push the plurality of pivot shafts (7) towards a location whereby the flexible plate (1) remains in the flat state.

6. The hinge device as claimed in claim 5, wherein an end of each of the first and the second shaft holes (31, 41) located farther away from the first and the second outer cut (311, 411) communicates with a first and a second hollow hole (314, 414) via a first and a second inner cut (313, 413), respectively.

7. The hinge device as claimed in claim 1, further comprising a first and a second stop plate set (5, 6) superposed on the first and the second torque plate set (3, 4), respectively; the first and the second stop plate sets (5, 6) including a plurality of first and second stop plates (50, 60), respectively; the first stop plates (50) being superposed on the first torque plates (30) and respectively including a first limiting hole (51) and a first elongated limiting hole (52) corresponding to the first shaft hole (31) and the first elongated shaft hole (32) of the first torque plate (30), respectively; and the second stop plates (60) being superposed on the second torque plates (40) and respectively including a second limiting hole (61) and a second elongated limiting hole (62) corresponding to the second shaft hole (41) and the second elongated shaft hole (42) of the second torque plate (40), respectively.

8. The hinge device as claimed in claim 2, further comprising a first and a second stop plate set (5, 6) superposed on the first and the second torque plate set (3, 4), respectively; the first and the second stop plate sets (5, 6) including a plurality of first and second stop plates (50, 60), respectively; the first stop plates (50) being superposed on the first torque plates (30) and respectively including a first limiting hole (51) and a first elongated limiting hole (52) corresponding to the first shaft hole (31) and the first elongated shaft hole (32) of the first torque plate (30), respectively; and the second stop plates (60) being superposed on the second torque plates (40) and respectively including a second limiting hole (61) and a second elongated limiting hole (62) corresponding to the second shaft hole (41) and the second elongated shaft hole (42) of the second torque plate (40), respectively.

9. The hinge device as claimed in claim 1, wherein each of the plurality of supports (20) is formed with at least one supporting section (21), and each of the at least one supporting section (21) is formed with an engaging bore (22) for a corresponding one of the plurality of pivot shafts (7) to engage therewith to thereby move synchronously with the plurality of supports (20) in a linked motion.

10. The hinge device as claimed in claim 2, wherein each of the plurality of supports (20) is formed with at least one supporting section (21), and each of the at least supporting section (21) is formed with an engaging bore (22) for a corresponding one of the plurality of pivot shafts (7) to engage therewith to thereby move synchronously with the plurality of supports (20) in a linked motion.

11. The hinge device as claimed in claim 7, wherein each of the plurality of supports (20) is formed with at least one supporting section (21), and each of the at least one supporting section (21) is formed with an engaging bore (22) for a corresponding one of the plurality of pivot shafts (7) to engage therewith to thereby move synchronously with the plurality of supports (20) in a linked motion.

12. The hinge device as claimed in claim 9, wherein each of the plurality of pivot shafts (7) is formed with a distal end located away from a corresponding supporting section (21) and formed with a fastening hole (71); the distal end being covered by a pressing cover (8) formed with a through hole (81); and a plurality of fastening elements (82) are extended through the respective through holes (81) to be removably fastened to the respective fastening holes (71) for fixing and covering the respective pressing covers (8) to the distal ends of the respective plurality of pivot shafts (7).

13. The hinge device as claimed in claim 1, wherein the flexible plate (1) is connected along its outer edges with a frame (11), and the frame (11) being formed along an inner periphery with a groove (12); and each of the plurality of supports (20) being formed on at least one of the two opposing end portions with an axially extended protrusion (23) for inserting into the groove (12), thereby the plurality of supports (20) are connected to the corresponding side surface of the flexible plate (1) via the frame (11).

14. The hinge device as claimed in claim 2, wherein the flexible plate (1) is connected along its outer edges with a frame (11), and the frame (11) being formed along an inner periphery with a groove (12); and each of the plurality of supports (20) being formed on at least one of the two opposing end portions with an axially extended protrusion (23) for inserting into the groove (12), thereby the plurality of supports (20) are connected to the corresponding side surface of the flexible plate (1) via the frame (11).

15. The hinge device as claimed in claim 1, wherein the support unit (2) includes at least one base (200) parallelly connected to a corresponding one of the plurality of supports (20).

16. The hinge device as claimed in claim 2, wherein the support unit (2) includes at least one base (200) parallelly connected to a corresponding one of the plurality of supports (20).

17. The hinge device as claimed in claim 7, wherein the support unit (2) includes at least one base (200) parallelly connected to a corresponding one of the plurality of supports (20).

18. The hinge device as claimed in claim 9, wherein the support unit (2) includes at least one base (200) parallelly connected to a corresponding one of the plurality of supports (20).

19. A display device including the hinge device as claimed in claim 1, and a flexible display (10) attached to a surface of the flexible plate (1) located opposite to the support unit (2).

20. A display device including the hinge device as claimed in claim 2, and a flexible display (10) attached to a surface of the flexible plate (1) located opposite to the support unit (2).

21. A display device including the hinge device as claimed in claim 7, and a flexible display (10) attached to a surface of the flexible plate (1) located opposite to the support unit (2).

22. A display device including the hinge device as claimed in claim 9, and a flexible display (10) attached to a surface of the flexible plate (1) located opposite to the support unit (2).

23. A display device including the hinge device as claimed in claim 15, and a flexible display (10) attached to a surface of the flexible plate (1) located opposite to the support unit (2).

* * * * *